Patented Oct. 5, 1943

2,331,008

UNITED STATES PATENT OFFICE 2,331,008

ANTIHEMORRHAGIC COMPOUND

Max Tishler, Rahway, N. J., and Norman L. Wendler, Ann Arbor, Mich., assignors to Merck & Co. Inc., Rahway, N. J., a corporation of New Jersey No Drawing. Original application April 5, 1940, Serial No. 328,161. Divided and this application August 1, 1942, Serial No. 453,283. In Canada December 31, 1940

4 Claims. (Cl. 260—396)

This is a division of co-pending application Ser. No. 328,161, filed April 5, 1940, for Antihemorrhagic compound.

This invention relates to antihemorrhagic substances, especially such as those that may be derived from by-products of various processes for the synthesis of vitamin $K_1$, and to their isolation, and to methods of converting such by-products to vitamin $K_1$.

Recently developed methods for the synthesis of vitamin $K_1$ involve, in the main, reactions between naphthoquinones and phytol, in appropriately reactive forms, appropriately adapted. In many such cases, it has been found that in addition to the main objective of the process, i. e., the synthetic production of vitamin $K_1$ per se, certain hitherto unknown and unsuspected products may be formed, which the applicant has found can be isolated by proper methods applied by him to the mother liquors of such vitamin $K_1$ synthetic processes. Such isolation products have been chemically differentiated from the known vitamin $K_1$, and have been found by appropriate biological assay to possess distinct antihemorrhagic activity.

Thus, in a typical example for the synthesis of vitamin $K_1$, according to the method which Fieser described in the "Journal of the American Chemical Society," 61, 3467 (1939), phytol is reacted with 2-methyl-1,4-naphthohydroquinone in dioxane in the presence of oxalic acid as a catalyst. In addition to the dihydro vitamin $K_1$ (2-methyl-3-phytyl-1,4-naphthohydroquinone) produced by this method of Fieser—i. e., the dihydro compound which is later to be oxidized to vitamin $K_1$, it has now been found by the applicant that, among the by-products formed in this reaction, is a product which may be isolated as a distinct chemical entity possessing antihemorrhagic activity.

According to the method of Fieser (supra), the synthetic process for producing dihydro vitamin $K_1$ is conducted about as follows:

A mixture of 10 gms. of 2-methyl-1,4-naphthohydroquinone, 2.96 gms. of phytol, 2.3 gms. of anhydrous oxalic acid, and 30 cc. of dioxane is maintained at 75° C. for 34 hours. At the end of this time the reaction mixture is added to a mixture of ether and an aqueous solution containing 2 per cent potassium hydroxide and 2 per cent sodium hydrosulfite. After shaking, the ether layer is separated and washed with 2 per cent aqueous potassium hydroxide and sodium hydrosulfite until the aqueous extracts are no longer colored. The ether solution is concentrated, taken up in petroleum ether, and chilled in ice-water. The waxy dihydro vitamin $K_1$ (2-methyl-3-phytyl-1,4-naphthohydroquinone) is separated by centrifuging.

At this point the method of isolating and producing the new compound which is a particular objective of the instant application may be carried out by the following steps, which are given for exemplification:

After the synthesized dihydro vitamin $K_1$ has been removed by centrifugation, the residual mother liquor, which is the petroleum ether filtrate resulting from that centrifuging, is then shaken with a 35 per cent solution of potassium hydroxide in methanol (made by dissolving 35 gms. of potassium hydroxide in 25 cc. of water and then adding sufficient methanol to make a volume of 100 cc.) to which has been added small amounts of sodium hydrosulfite until the alkaline extract is colorless. This operation removes small traces of dihydro vitamin $K_1$ retained by the petroleum ether. The petroleum ether solution is then concentrated to an oil, which is fractionated in high vacuo. A low boiling fraction comes over below 100° C. which is a mixture of phytadiene and phytol. When the inside temperature is about 140° C., a very pale yellow oil distills over which weighs about 0.6 gm. This pale yellow oil is the new active agent referred to above. It is a somewhat mobile liquid, having a refractive index indicated by $n_D{}^{25}=1.5095$ and the empirical formula $C_{31}H_{48}O_2$.

Anal. calcd. for $C_{31}H_{48}O_2$: C, 82.30; H, 10.66.

Found: C, 82.53, 82.50, 82.38; H, 10.80, 10.65, 10.86.

The new product, thus isolated and characterized, is produced in relatively large quantities during the preparation of vitamin $K_1$ by such methods as described. It has vitamin $K_1$ activity per se, and will serve as an intermediate for the production of vitamin $K_1$.

In respect to the probable chemical identity of this new product, the following structures have appeared to be possible in view of a consideration of the reaction:

I. By direct etherification

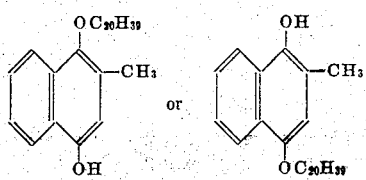

II. By cyclization of dihydro vitamin $K_1$ due to presence of acids

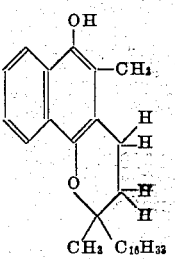

III. By 1,2 addition

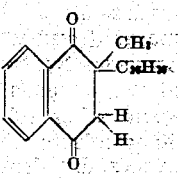

IV. By 1,4 addition

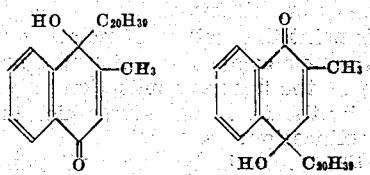

Structure III is favored as the structure of this new product for the following reasons:

Structure I was eliminated by: (1) When the new product is heated, it rearranges to form vitamin $K_1$. Preferably, the heating is carried out in the presence of an inert solvent and/or an inert gas. According to Claisen, allyl ether rearranged so that the point of attachment, when the substituted allyl group moves into the ortho position, is the gamma carbon rather than the original alpha carbon. In other words, Structure I would re-arrange as follows:

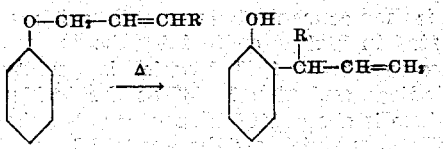

which is not a structure analagous to that of vitamin $K_1$. (2) The absorption spectrum of monoethylether of 2-methyl-1,4-naphthohydroquinone is quite different from that of the new product.

Structure II was eliminated by the fact that the new product is resistant to oxidation by silver nitrate or gold chloride. Structure II is a chromane and chromanes are oxidized by these reagents. In addition, naphthotocopherol has been synthesized by treating vitamin $K_1$ with stannous chloride in a mixture of hydrochloric and acetic acid. The tocopherol thus formed does reduce silver nitrate and gold chloride and has an entirely different absorption spectrum from that of the new product.

Structures III and IV are consistent with the following facts:

(1) The new product forms a ketone derivative.
(2) The new product brominates readily with the elimination of hydrogen bromide.
(3) The new product reacts with methyl magnesium iodide, using 2 moles of the reagent and, during the course of the reaction, one mole of methane is formed. (III can give methane because the $CH_2$ group adjacent to the quinone can enolize.)
(4) The new product reacts with aluminum isopropylate to give a diol. This reagent is specific for the reduction of ketone oxygen. Structure III is favored because: (1) The new product does not dehydrate when subjected to rather drastic conditions. It would be expected that a compound containing a tertiary hydroxyl as is the case in IV would readily dehydrate. (2) In the reduction using aluminum isopropylate four atoms of hydrogen are added. For four atoms of hydrogen to be used is possible only in the case of III. (3) The new product brominates very easily forming hydrogen bromide in the process. It would be expected III would brominate much more readily in this way than IV.

Conversion of new product to vitamin $K_1$: Two grams of the new product is mixed with 5 cc. of decalin and heated to boiling for 18 hours while a rapid stream of nitrogen is passed through the mixture. Following the heating, the mixture is concentrated to dryness under reduced pressure and the residue containing 2-methyl-3-phytyl-1,4-naphthoquinone is suspended in 50 cc. of methanol. A solution of 2 gms. of sodium hydrosulfite in 4 cc. of water is added and the whole shaken for 15 minutes. The mixture is poured into three volumes of water, 20 cc. of ether are added, the mixture is shaken, and the ether layer is separated. The ether extract is then washed with an aqueous solution containing 2 per cent potassium hydroxide and 2 per cent sodium hydro sulfite until all the 2-methyl-1,4-naphthohydroquinone which was formed in the reaction is removed. (About 200 mgm. is obtained.) The ether solution is concentrated to dryness in vacuo using nitrogen and the residue taken up in 50 cc. of petroleum ether. The petroleum ether solution is shaken with Claisen's alkali containing small amounts of sodium hydrosulfite. The resultant 2-methyl-3-phytyl-1,4-naphthohydroquinone goes into the alcoholic alkaline layer (that is, the Claisen alkali layer) giving a yellow solution. This extraction with Claisen's alkali is continued until the extracts are colorless. (The petroleum ether layer contains unchanged starting material. This was established by isolating it and identifying it by analysis and refractive index.) The Claisen alkali extracts are combined and poured into 4 volumes of water slowly and the resulting mixture extracted with 10 cc. of petroleum ether. The petroleum ether extract is separated, chilled, and the resultant 2-methyl-3-phytyl-1,4-naphthohydroquinone is removed by centrifuging and purified by repeated washings with cold petroleum ether. This dihydro compound can then be converted to vitamin $K_1$ by methods now known.

A method for isolating the new product, and a method for converting it to 2-methyl-3-phytyl-1,4-naphthohydroquinone, have been given in the foregoing examples, but it is to be understood that certain modifications may be made by those skilled in the art without departing from the spirit and scope of the invention.

We claim:

1. Process of converting a substance having the formula

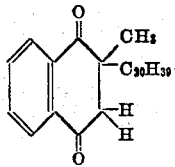

into 2-methyl-3-phytyl-1,4-naphthoquinone, consisting of heating the said substance, whereby conversion is effected.

2. Process of converting a substance having the formula

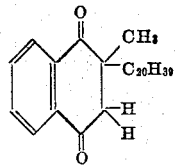

into 2-methyl-3-phytyl-1,4-naphthoquinone, consisting of heating the said substance in the presence of an inert solvent, whereby conversion is effected.

3. Process of converting a substance having the formula

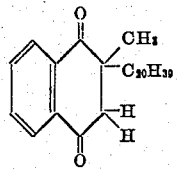

into 2-methyl-3-phytyl-1,4-naphthoquinone, consisting of heating the said substance in the presence of an inert solvent and an inert gas, whereby conversion is effected.

4. Process for the conversion of a substance having the formula

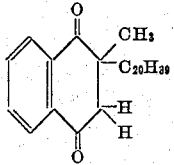

to 2-methyl-3-phytyl-1,4-naphthoquinone comprising the steps of mixing the said substance with an inert organic solvent, heating the resulting mixture in the presence of nitrogen, drying the resulting mixture under reduced pressure, suspending the residue containing 2-methyl-3-phytyl-1,4-naphthoquinone in an inert organic liquid, treating the resulting suspension with an aqueous solution of sodium hydrosulfite, separating and purifying the resulting 2-methyl-3-phytyl-1,4-naphthohydroquinone and converting it to 2-methyl-3-phytyl-1,4-naphthoquinone.

MAX TISHLER.
NORMAN L. WENDLER.